US010291036B2

(12) United States Patent
Muratov

(10) Patent No.: US 10,291,036 B2
(45) Date of Patent: May 14, 2019

(54) MULTI-MODE RESONANT WIRELESS POWER TRANSMITTER

(71) Applicant: MediaTek Inc., Hsin-Chu (TW)

(72) Inventor: Vladimir A. Muratov, Manchester, NH (US)

(73) Assignee: MediaTek Inc., Hsin-Chu (TW)

( * ) Notice: Subject to any disclaimer, the term of this patent is extended or adjusted under 35 U.S.C. 154(b) by 250 days.

(21) Appl. No.: 14/990,833

(22) Filed: Jan. 8, 2016

(65) Prior Publication Data

US 2017/0018937 A1 Jan. 19, 2017

Related U.S. Application Data

(60) Provisional application No. 62/193,803, filed on Jul. 17, 2015.

(51) Int. Cl.
| | | |
|---|---|---|
| H02J 5/00 | (2016.01) | |
| H02J 7/02 | (2016.01) | |
| H02J 50/12 | (2016.01) | |
| H02J 50/40 | (2016.01) | |
| H02J 50/80 | (2016.01) | |

(52) U.S. Cl.
CPC .............. *H02J 5/005* (2013.01); *H02J 7/025* (2013.01); *H02J 50/12* (2016.02); *H02J 50/40* (2016.02); *H02J 50/80* (2016.02)

(58) Field of Classification Search
CPC .. H02J 5/005; H02J 7/025; H02J 17/00; H02J 50/10; H02J 50/12; H02J 50/40; H02J 50/80
USPC ........................................................ 307/104
See application file for complete search history.

(56) References Cited

U.S. PATENT DOCUMENTS

| | | | | |
|---|---|---|---|---|
| 8,129,864 B2* | 3/2012 | Baarman | ................. | H02J 5/005 |
| | | | | 307/104 |
| 8,217,535 B2 | 7/2012 | Uchida et al. | | |
| 8,378,524 B2* | 2/2013 | Mita | ..................... | B60L 11/182 |
| | | | | 307/104 |
| 2010/0259109 A1* | 10/2010 | Sato | ........................ | H02J 7/025 |
| | | | | 307/104 |
| 2012/0038220 A1 | 2/2012 | Kim et al. | | |
| 2012/0119587 A1* | 5/2012 | Cheon | ..................... | H01F 38/14 |
| | | | | 307/104 |
| 2013/0002035 A1* | 1/2013 | Oodachi | ............... | H04B 5/0037 |
| | | | | 307/104 |

(Continued)

FOREIGN PATENT DOCUMENTS

| | | |
|---|---|---|
| CN | 103155059 A | 6/2013 |
| WO | WO 2014/191609 A1 | 12/2014 |

OTHER PUBLICATIONS

Extended European Search Report for Application No. EP 16179120.7 dated Feb. 15, 2017.

*Primary Examiner* — Levi Gannon
(74) *Attorney, Agent, or Firm* — Wolf, Greenfield & Sacks, P.C.

(57) ABSTRACT

A wireless power transmitter includes a multi-mode drive circuit having a controllable resonant frequency. The multi-mode drive circuit is controlled to have a first resonant frequency to drive wireless power transmission at a first transmit frequency. The multi-mode drive circuit is also controlled to have a second resonant frequency higher than the first resonant frequency to drive wireless power transmission at a second transmit frequency higher than the first transmit frequency.

24 Claims, 6 Drawing Sheets

(56) References Cited

U.S. PATENT DOCUMENTS

| | | | |
|---|---|---|---|
| 2013/0062961 A1* | 3/2013 | Park | H02J 17/00 |
| | | | 307/104 |
| 2013/0181539 A1* | 7/2013 | Muratov | H01F 38/14 |
| | | | 307/104 |
| 2015/0061403 A1 | 3/2015 | Jeong et al. | |
| 2015/0097438 A1* | 4/2015 | Aioanei | H02J 7/025 |
| | | | 307/104 |
| 2015/0115727 A1 | 4/2015 | Carobolante et al. | |
| 2015/0115729 A1* | 4/2015 | Kanno | H02J 5/005 |
| | | | 307/104 |
| 2015/0333530 A1* | 11/2015 | Moyer | H02J 7/025 |
| | | | 307/104 |

* cited by examiner

MULTI-MODE RESONANT WIRELESS POWER TRANSMITTER

CROSS-REFERENCE TO RELATED APPLICATIONS

This application claims priority to U.S. provisional application Ser. No. 62/193,803, titled "DUAL MODE CLASS-E WIRELESS POWER TRANSMITTER," filed Jul. 17, 2015, which is hereby incorporated by reference in its entirety.

BACKGROUND

1. Technical Field

The techniques described herein relate generally to wireless power delivery, and particularly to a wireless power transmitter capable of transmitting wireless power at more than one frequency.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees such as the Wireless Power Consortium (WPC), the Power Matters Alliance (PMA), and the Alliance for Wireless Power (A4WP) have been working on developing international standards for consumer products based on wireless power transfer. Currently, due to the difference in operating frequency, WPTS systems of different types are not interoperable. This creates complications and inconveniences to wireless system users and limits proliferation of the technology.

SUMMARY

Some embodiments relate to wireless power transmitter that includes a multi-mode drive circuit having a controllable resonant frequency. The multi-mode drive circuit is controlled to have a first resonant frequency to drive wireless power transmission at a first transmit frequency. The multi-mode drive circuit is controlled to have a second resonant frequency higher than the first resonant frequency to drive wireless power transmission at a second transmit frequency higher than the first transmit frequency.

Some embodiments relate to a wireless power transmission method. The method includes controlling a multi-mode drive circuit having a controllable resonant frequency to have a first resonant frequency to drive wireless power transmission at a first transmit frequency. The method also includes controlling the multi-mode drive circuit to have a second resonant frequency higher than the first resonant frequency to drive wireless power transmission at a second transmit frequency higher than the first transmit frequency.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

The inventors have recognized and appreciated that a multi-mode wireless power transmitter capable of transmitting wireless power at different frequencies can facilitate providing power to different types of wireless power receivers designed to operate at different frequencies. Such a multi-mode wireless power transmitter can allow providing power to a wider variety of electronic devices. For example, in some embodiments a multi-mode wireless power transmitter can be configured to provide power to both MI and MR receivers. In some embodiments, a multi-mode wireless power transmitter can provide power to devices that are designed according to a variety of different wireless charging specifications, such as the Qi standard promulgated by WPC, and other specifications designed for wireless power delivery at other frequencies, such as specifications for MR receivers, or other MI specifications. Such a multi-mode wireless power transmitter can support different types of receivers, enabling consumers to avoid the need to make a choice between different wireless power specifications, and can reduce or eliminate the need to acquire multiple wireless transmitters to power devices that receive wireless power at different frequencies.

Described herein are embodiments of wireless power transmitters that include a resonant drive circuit that can be dynamically tuned to drive wireless power transmission at different frequencies. The resonant drive circuit includes an LC network that resonates at a frequency determined by the magnitude of the inductance and capacitance. In some embodiments, the resonant capacitance and/or the inductance is modified to facilitate wireless power transmission at different frequencies.

Figure 1:
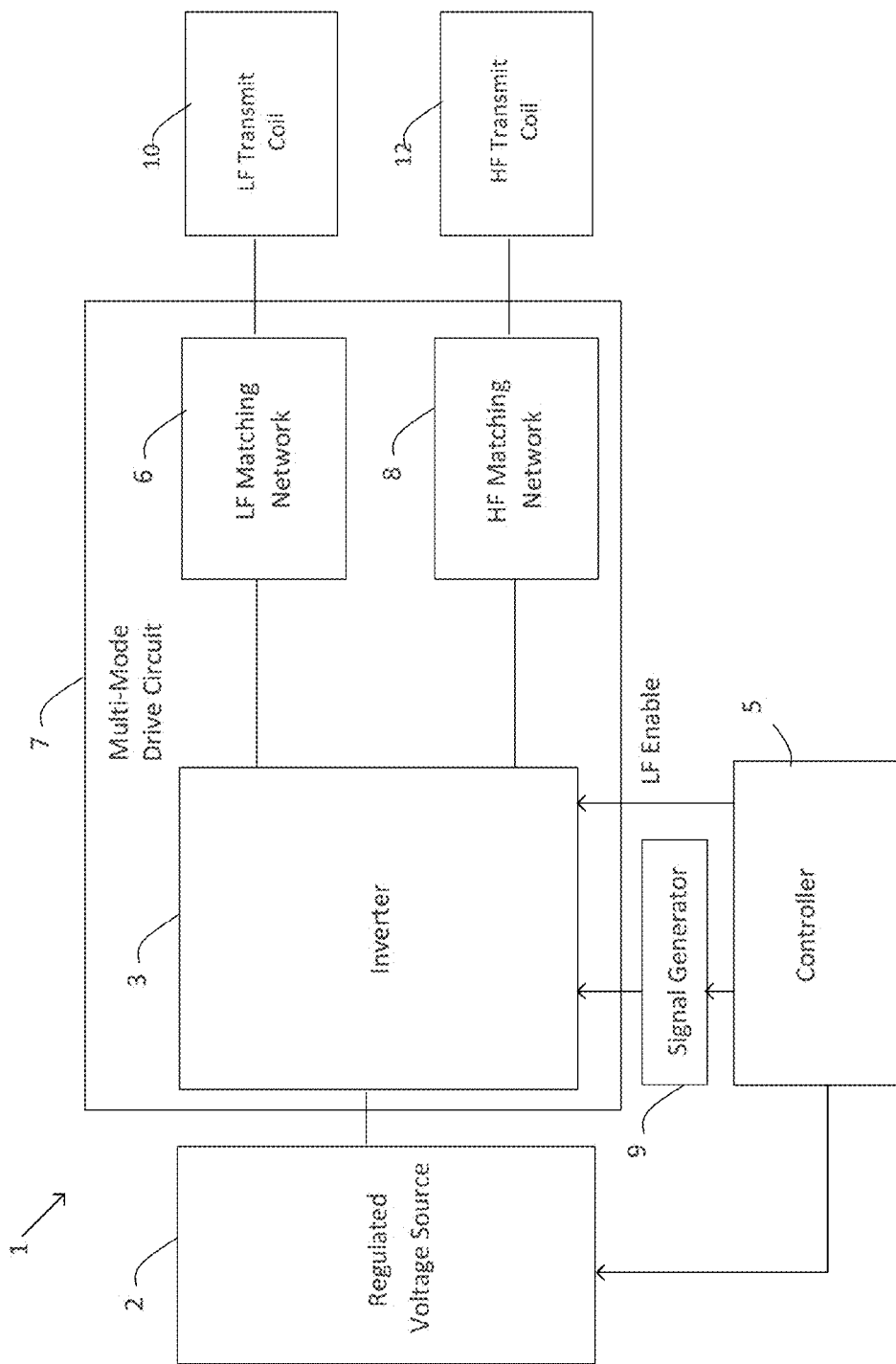
FIG. 1 shows a block diagram of a multi-mode wireless power transmitter.

FIG. 1 shows a block diagram of a multi-mode wireless power transmitter 1 in which a multi-mode drive circuit 7 has an inverter 3 that can be switched into different modes of operation for wireless transmission at different frequencies. For example, the multi-mode drive circuit 7 can be switched into a low frequency mode for driving a low frequency transmit coil 10 via a low frequency matching network 6, or a high frequency mode for driving a high frequency transmit coil 12 via a high frequency matching network 8. The multi-mode wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. The multi-mode drive circuit 7 may be a class E amplifier that converts the DC voltage at the input of inverter 3 into an AC output voltage to drive the low frequency transmit coil 10 or high frequency transmit coil 12. Producing an AC output voltage enables wireless power transmission through electromagnetic induction.

Inverter 3 may be controlled to operate in different modes by controller 5. The controller 5 of the multi-mode wireless power transmitter 1 may control a signal generator 9 to drive the inverter 3 with signals of a selected wireless power transmission frequency. As an example for a low frequency mode of operation, to transmit power to a receiver designed to receive wireless power according to the Qi specification the inverter 3 may be switched at a frequency between 100 and 205 kHz for low power Qi receivers and 80-300 kHz for medium power Qi receivers. As an example for a high frequency mode of operation, to transmit power to a receiver designed to receive wireless power using MR technology, the inverter 3 may be switched at a higher frequency, such as a frequency of greater than 1 MHz, within an ISM band, e.g., 6.765 MHz to 6.795 MHz. However, these frequencies are described merely by way of example, as wireless power may be transmitted at a variety of suitable frequencies, in accordance with any suitable specification.

In some embodiments, multi-mode drive circuit 7 may be designed to minimize or otherwise reduce switching power losses. Switching power losses are incurred in a switch when there is a non-zero voltage across the switch and it is turned on or off, which dissipates or charges the switch's parasitic capacitance. Switching power losses are proportional to frequency, and therefore are more severe at high frequencies. Switching losses can be minimized or reduced by using an inverter that is designed to turn the switch on or off when the voltage across the switch is zero or close to zero. Such a technique is termed "zero-voltage switching."

In some embodiments, the multi-mode drive circuit 7 may be a class E amplifier. A class E amplifier may use LC resonance to cause the voltage across a switch to ring down to zero or approximately zero by the time the switch switches, which can achieve or approximate zero-voltage switching. However, the techniques described herein are not limited to use of a class E amplifier for multi-mode drive circuit 7, as another suitable amplifier configuration may be used, such as another type of resonant amplifier. The multi-mode drive circuit 7 may be a single-ended amplifier or a differential amplifier, as the techniques described herein are not limited in this respect.

Multi-mode drive circuit 7 may be a multi-mode amplifier that can be switched into a different modes of operation by modifying its resonant frequency. In a low frequency mode of operation, the multi-mode drive circuit 7 is tuned to a relatively low resonant frequency by adjusting a variable capacitance and/or inductance of the multi-mode drive circuit 7. In a high frequency mode of operation, the multi-mode drive circuit 7 is tuned to a relatively high resonant frequency by adjusting the variable capacitance and/or inductance of the multi-mode drive circuit 7. Examples of circuits that can adjust the variable capacitance and/or inductance multi-mode drive circuit 7 are discussed with respect to FIGS. 2 and 4.

One or more matching networks 6, 8 may be provided for the transmit coils which facilitate wireless power delivery by presenting a suitable impedance to the inverter 3. The matching network(s) may have one or more capacitive or inductive elements or any suitable combination of capacitive and inductive elements. Since the transmit coils may have an inductive impedance, in some embodiments the matching network(s) may include one or more capacitive elements, which, when combined with the impedance(s) of a transmit coil, presents an impedance to the output of inverter 3 suitable for driving the respective transmit coil. In some embodiments, the resonant frequency of the matching networks 6 and 8 may be set equal to or approximately equal to the switching frequency of the inverter 3.

The transmit coils 10, 12 may be realized by any suitable type of conductors. The conductors may be wires, including solid wire or Litz wire, or patterned conductors, such as patterned conductors of a PC board or an integrated circuit.

Controller 5 may be an analog circuit or a digital circuit. Controller 5 may be programmable, and may command signal generator 9 to produce signals at a desired transmission frequency based on stored program instructions, so that inverter 3 switches at the desired transmission frequency.

Figure 2A:
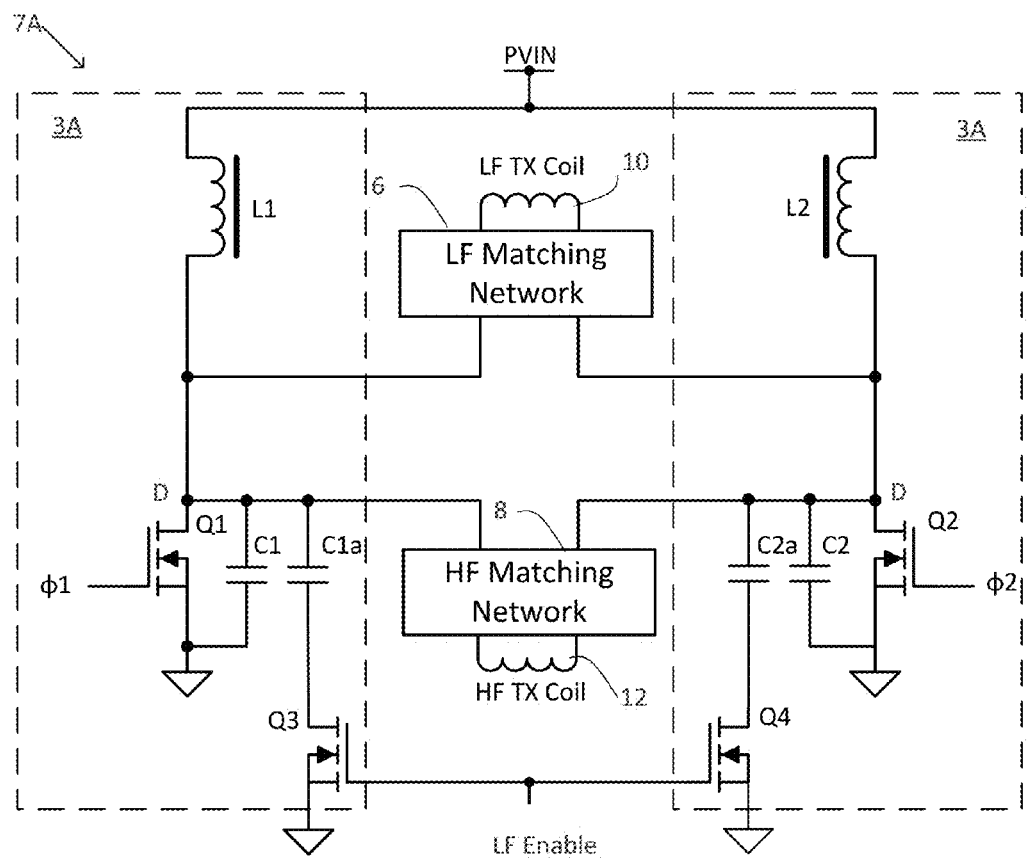
FIG. 2A shows an example of a multi-mode wireless power transmitter in which the multi-mode drive circuit is implemented by a class E differential amplifier.

FIG. 2A shows an example in which the multi-mode drive circuit 7A is implemented by a class E differential amplifier. The inverter 3A includes transistors Q1 and Q2, inductors L1 and L2, capacitors C1 and C2, capacitors C1$a$ and C2$a$ and transistors Q3 and Q4.

In a low frequency mode of operation of multi-mode drive circuit 7A, transistors Q3 and Q4 are turned on (conductive) by setting the signal LF Enable high, which connects capacitor C1$a$ in parallel with C1 and connects capacitor C2$a$ in parallel with C2, and thus increases the capacitance that resonates with inductor L1 and L2, which reduces the resonant frequency of the inverter 3A. Signal generator 9 produces signals $\varphi$1 and $\varphi$2 that drive the transistors Q1 and Q2 at the selected transmission frequency, which differentially drives the low frequency transmit coil 10 via the low frequency matching network 6. The high frequency matching network 8 may have one or more components that have a high impedance at low transmit frequencies, which attenuates low frequency signals to inhibit them from driving the high frequency transmit coil 12.

In a high frequency mode of operation of multi-mode drive circuit 7A, transistors Q3 and Q4 are turned off (non-conductive) by setting the signal LF Enable low, which disconnects capacitors C1$a$ and C2$a$ from the circuit, and capacitor C1 resonates with inductor L1 (and capacitor C2 resonates with inductor L2) at a higher frequency. Signal generator 9 produces signals $\varphi$1 and $\varphi$2 that drive the transistors Q1 and Q2 at the selected (high) transmission frequency, which differentially drives the high frequency transmit coil 12 via the high frequency matching network 8. The low frequency matching network 6 may have one or more components that have a high impedance at high transmit frequencies, which attenuates high frequency signals to inhibit them from driving the low frequency transmit coil 10.

Thus, multi-mode drive circuit 7 may be tuned to different resonant frequencies suitable for driving wireless power transmission at different frequencies. In some embodiments, controller 5 and/or signal generator 9 may control activation of transistors Q3 and Q4 by producing the signal LF Enable based upon the selected switching frequency of inverter 3, as illustrated in FIG. 1.

In some embodiments, capacitor C1 has a lower capacitance than capacitor C1a and capacitor C2 has a lower capacitance than capacitor C2a. In some embodiments, the ratio of capacitance values of capacitor C1a to capacitor C1 is approximately (e.g., within plus or minus 10%) of the square root of the frequency ratio between the transmission frequencies for the high and low frequency modes of operation. As an example, if the high transmission frequency is 6.78 MHz and the low transmission frequency is 130 kHz, the ratio of capacitance values of capacitor C1a to capacitor C1 may be about 7.07, plus or minus 10%. The ratio of the ratio of capacitance values of capacitor C2a to capacitor C2 may be the same or approximately the same as the ratio of capacitance values of capacitor C1a to capacitor C1.

Figure 2B:
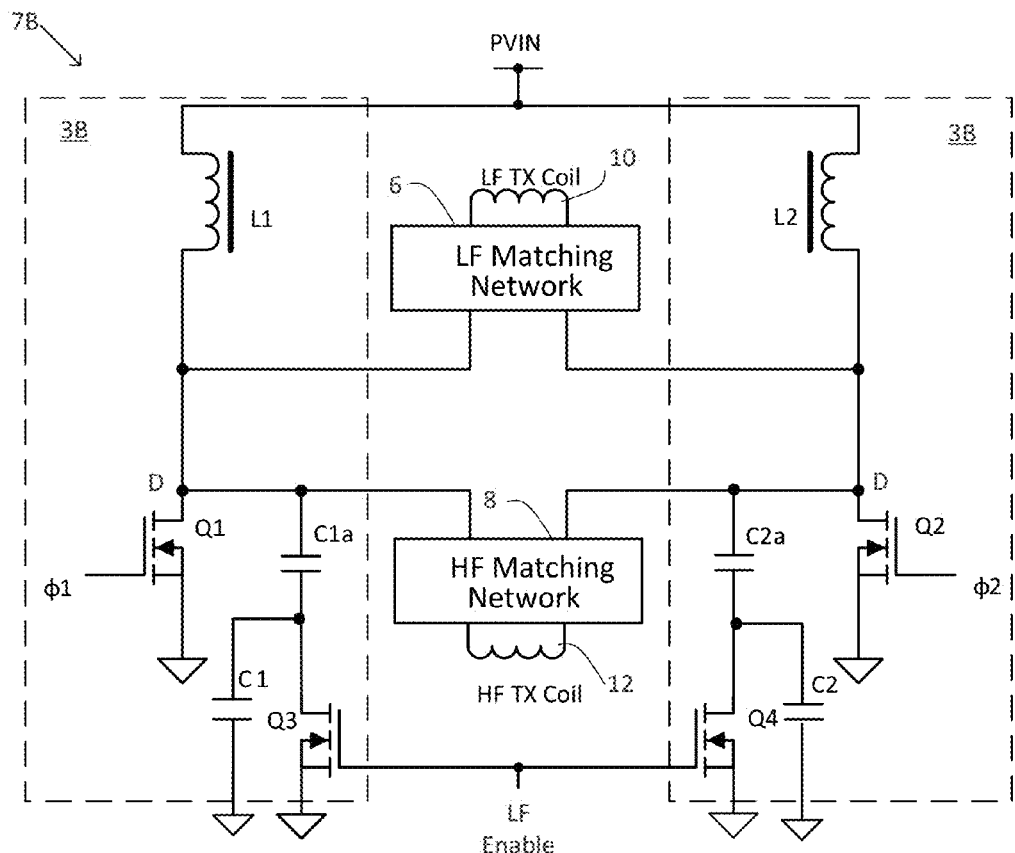
FIG. 2B shows another example in which the multi-mode drive circuit is implemented by a class E differential amplifier.

FIG. 2B shows another example in which the multi-mode drive circuit 7B is implemented by a class E differential amplifier Multi-mode drive circuit 7B is similar to multi-mode drive circuit 7A, with the exception that capacitors C1 and C1a of inverter 3B can be connected in series rather than in parallel. Transistor Q3 is connected in parallel with capacitor C1. Transistor Q3 turns on (conductive) to short out capacitor C1 in the low frequency mode of operation, when LF Enable is high. Transistor Q3 turns off (non-conductive) in the high frequency mode of operation, which causes capacitors C1 and C1a to be in series with one another. The series combination of capacitors C1 and C1a has a lower effective capacitance than capacitor C1a alone, thereby increasing the resonant frequency in the high frequency mode of operation. Transistor Q4 operates similarly. More specifically, transistor Q4 turns on (conductive) to short out capacitor C2 in the low frequency mode of operation, when LF Enable is high. Transistor Q4 turns off (non-conductive) in the high frequency mode of operation, which causes capacitors C2 and C2a to be in series with one another, the combination of which has a lower effective capacitance than capacitor C2a alone.

Figure 3A:
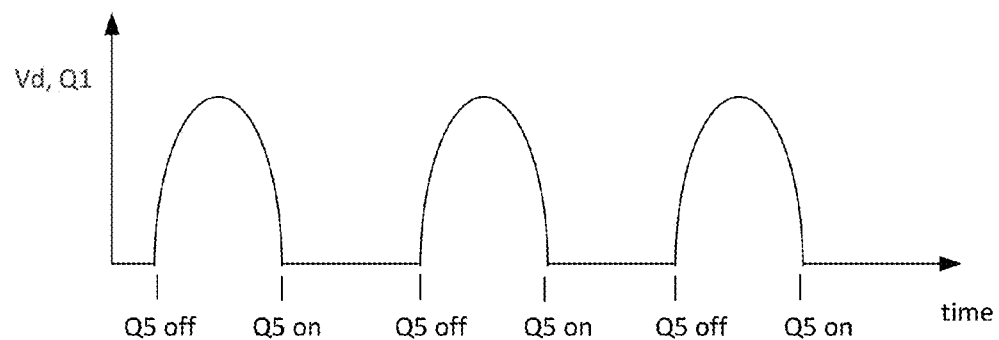
FIGS. 3A and 3B show transistor drain voltage waveforms for the transistors of the class E amplifier of FIG. 2A.
Figure 3B:
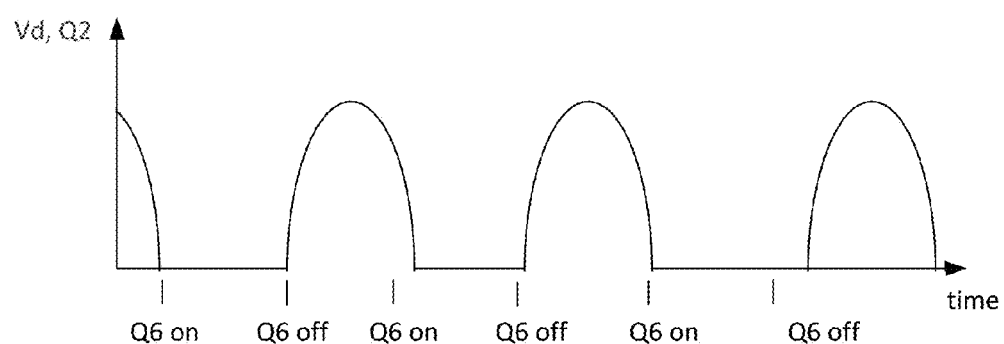

FIG. 3A shows the drain voltage waveform of transistor Q1, according to some embodiments. When transistor Q1 is turned off (non-conductive), the drain (D) voltage rises sinusoidally due to the resonance between the inductor L1 and capacitance C1 (and C1a, for low frequency operation). When the drain voltage rings down to zero, transistor Q1 is turned on. Thus, transistor Q1 can operate with zero voltage switching, which can improve the efficiency of the inverter 3. Transistor Q2 operates similarly but phase shifted 180° with respect to transistor Q1. Transistor Q1 and Q2 each may be turned on with approximately 50% duty ratio. FIG. 3B shows the drain voltage waveform of transistor Q2, according to some embodiments. Since transistor Q2 is connected to the opposite terminal of the matching networks compared to Q1, transistor Q2 produces a pulse of opposite polarity, as seen by the matching networks. The drain voltages of transistors Q1 and Q2 differentially drive the low frequency transmit coil 10 via the low frequency matching network 6 or the high frequency transmit coil 12 via the high frequency matching network 8.

Figure 4:
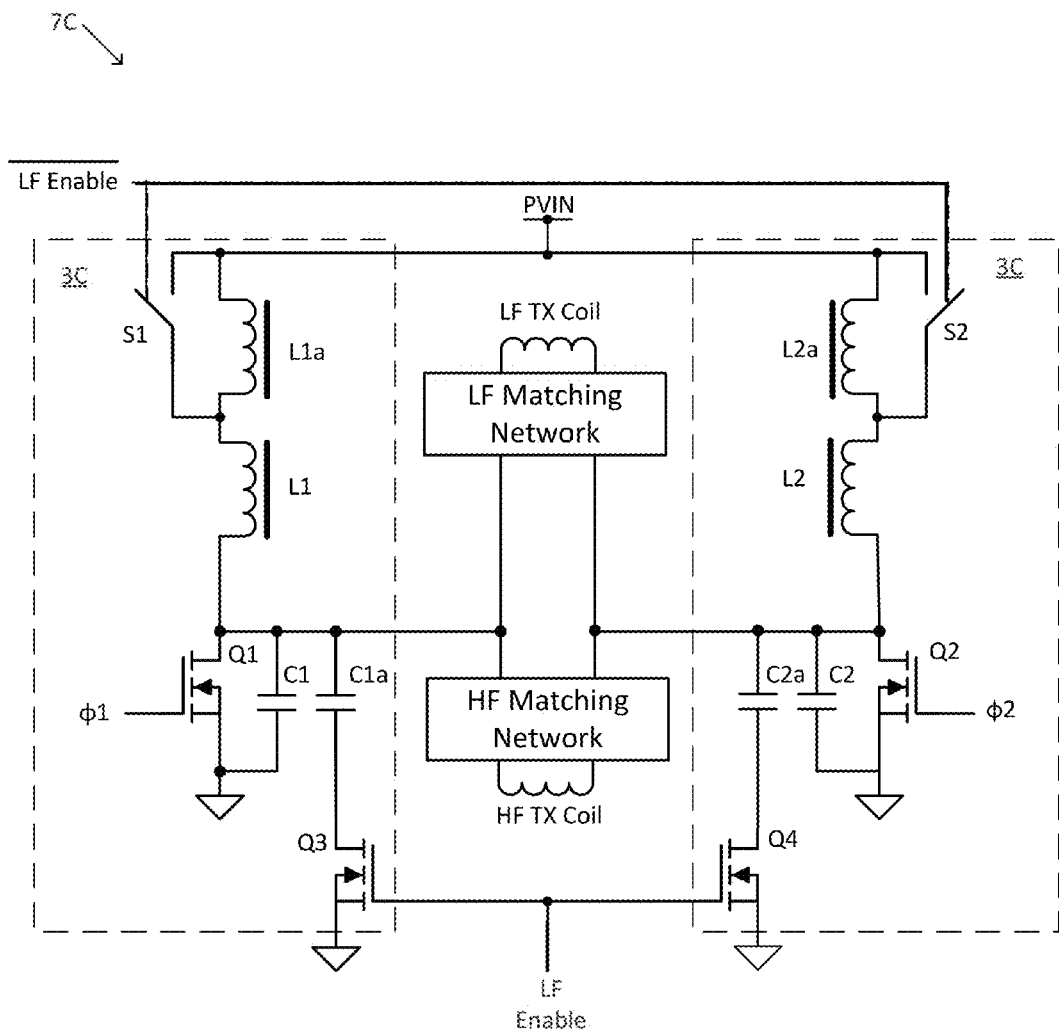
FIG. 4 shows an embodiment similar to FIG. 2A, in which an inductor can be connected to or disconnected from the multi-mode drive circuit.

FIG. 4 shows an embodiment of a multi-mode drive circuit 7C in which the resonant inductance can be adjusted. As shown in FIG. 4, inverter 3C has switches S1 and S2 in parallel with inductors L1a and L2a, respectively. Switches S1 and S2 may be controlled by the complement of the LF Enable signal. Switches S1 and S2 can be realized by mechanical or solid state AC switches, or any other suitable switches. When a low frequency signal is transmitted, switches S1 and S2 are turned off (non-conductive) by the LF Enable signal being set high, and inductors L1a and L2a are included in the resonant inductance, thereby lowering the resonant frequency. When a high frequency signal is transmitted, switches S1 and S2 are turned on by the LF Enable signal being set low, shorting out inductors L1a and L2a, thereby increasing the resonant frequency. Shorting out inductors L1a and L2a can also increase efficiency, as conduction losses due to the equivalent series resistance (ESR) of inductors L1a and L2a is removed when inductors L1a and L2a are shorted.

In the embodiment of FIG. 4, the capacitors C1, C1a and Q3 (as well as C2, C2a and Q4) are shown as connected in a configuration as illustrated in FIG. 2A. However, in some embodiments the capacitors C1, C1a and Q3 (as well as C2, C2a and Q4) of the inverter 3C may be connected in a configuration as illustrated in FIG. 2B.

As discussed above, a variety of wireless power receivers are being designed which can receive wireless power at different frequencies. In some embodiments, the multi-mode wireless power transmitter may detect the type of receiver that is present in the vicinity of the multi-mode wireless power transmitter, either through wireless communication with the receiver or another technique. For example, the multi-mode wireless power transmitter may detect or otherwise determine the wireless power specification used by the receiver. Such a determination may be made by the controller 5 of the multi-mode wireless power transmitter, in some embodiments. Controller 5 may then produce signals at the frequency suitable for wirelessly delivering power to the detected receiver.

Figure 5:
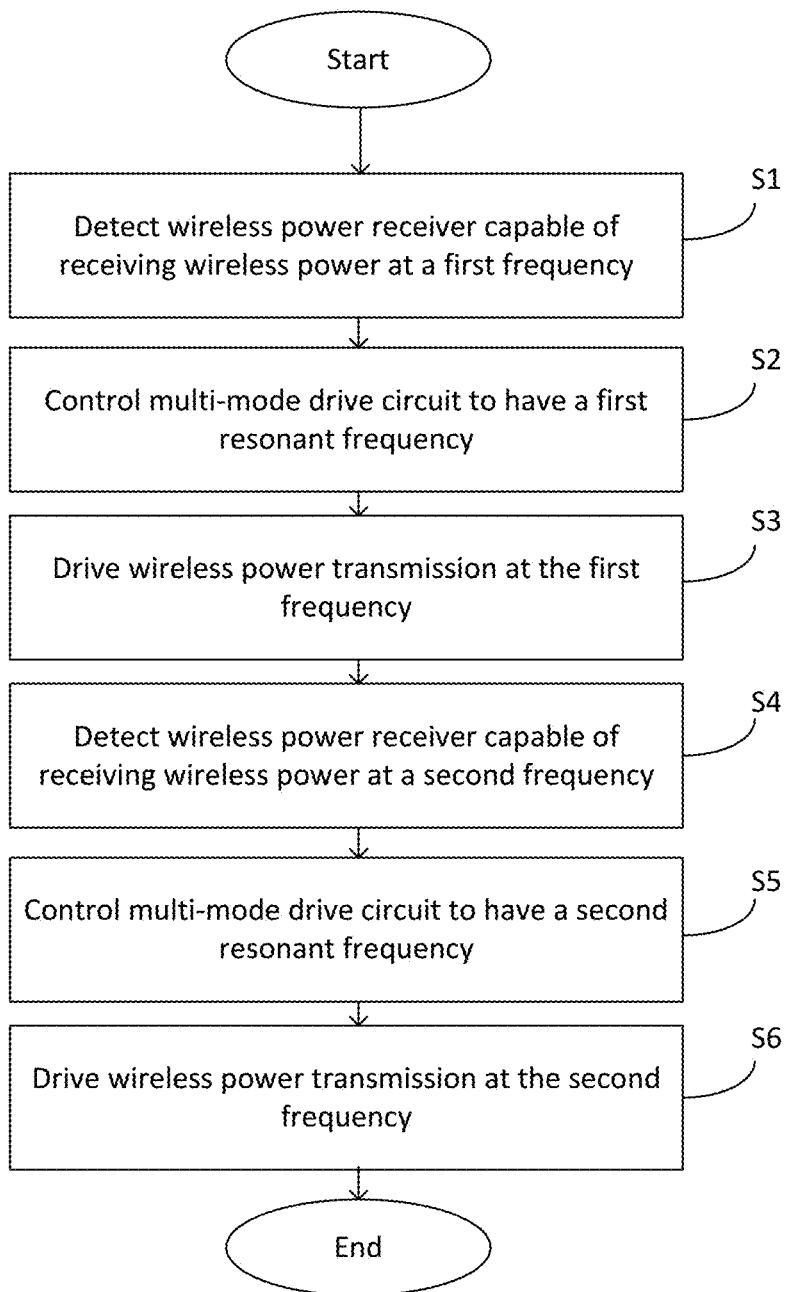
FIG. 5 shows a method of wireless power transmission, according to some embodiments.

FIG. 5 shows a flowchart of a method of wireless power transmission at different frequencies, according to some embodiments. In step S1, a wireless power receiver is detected that is capable of receiving wireless power. The wireless power transmitter communicates with the wireless power receiver to determine the frequency at which the wireless power receiver is capable of receiving wireless power. In step S2, the controller 5 controls the multi-mode drive circuit 7 to have a resonant frequency suitable for wireless power transmission to the receiver at the determined frequency. For example, as discussed above, if the detected wireless power receiver is capable of receiving power at a low frequency, the controller 5 may activate the LF Enable signal. In step S3, the multi-mode drive circuit 7 drives wireless power transmission to the receiver at the determined frequency. Subsequently, if another wireless power receiver is detected in the vicinity of the multi-mode wireless power transmitter that receives power at a different frequency, the multi-mode wireless power transmitter may determine another transmission frequency suitable for transmitting power to the newly-detected receiver in step S4. In step S5, the controller 5 controls the multi-mode drive circuit 7 to have a resonant frequency suitable for wireless power transmission to the receiver at the determined frequency of the newly-detected receiver. For example, as discussed above, if the newly-detected wireless power receiver is capable of receiving power at a high frequency, the controller 5 may deactivate the LF enable signal. In step S6, the multi-mode drive circuit 7 drives wireless power transmission to the newly-detected receiver at the determined frequency.

In some embodiments, a multi-mode wireless power transmitter may operate at more than two transmission frequencies or frequency bands. If so, the multi-mode drive circuit 7 may be configured to tune the resonant frequency to one or more additional frequencies. To allow tuning to additional frequencies, additional capacitors C1a, C2a and switches such as Q3, Q4 may be added in parallel with capacitors C1 and C2, respectively.

As discussed above, a multi-mode wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power transmitter, comprising:
    a multi-mode drive circuit having a controllable resonant frequency, the multi-mode drive circuit being controlled to have a first resonant frequency to drive wireless power transmission at a first transmit frequency, and being controlled to have a second resonant frequency different from the first resonant frequency to drive wireless power transmission at a second transmit frequency different from the first transmit frequency;
    a first matching network coupled to an output of the multi-mode drive circuit, wherein the first matching network is configured to provide a first signal at the first transmit frequency to a first transmit coil; and
    a second matching network coupled to the output of the multi-mode drive circuit, wherein the second matching network is configured to provide a second signal at the second transmit frequency to a second transmit coil,
    wherein the wireless power transmitter is configured to detect a type of wireless power receiver that is present in the vicinity of the wireless power transmitter, and control the multi-mode drive circuit to have the first resonant frequency in response to detecting that the wireless power receiver is of a type that receives power wirelessly at the first transmit frequency, and
    wherein the first matching network is connected to the second matching network.

2. The wireless power transmitter of claim 1, wherein the multi-mode drive circuit comprises an inverter.

3. The wireless power transmitter of claim 2, wherein the multi-mode drive circuit comprises a class E amplifier.

4. The wireless power transmitter of claim 1, wherein the multi-mode drive circuit has a variable capacitance that is controlled to change the controllable resonant frequency.

5. The wireless power transmitter of claim 4, wherein the multi-mode drive circuit comprises:
    a capacitor; and
    a switch controlled to connect or disconnect the capacitor to control whether the capacitor contributes to the variable capacitance.

6. The wireless power transmitter of claim 4, wherein the multi-mode drive circuit has a variable inductance that is controlled based on a mode of operation of the multi-mode drive circuit.

7. The wireless power transmitter of claim 6, wherein the multi-mode drive circuit comprises:
    an inductor; and
    a switch controlled to connect or disconnect the inductor to control whether the inductor contributes to the variable inductance.

8. The wireless power transmitter of claim 7, wherein the switch connects the inductor so that the inductor contributes to the variable inductance when the multi-mode drive circuit is controlled to drive wireless power transmission at the first transmit frequency.

9. The wireless power transmitter of claim 8, wherein the switch disconnects the inductor so that the inductor does not contribute to the variable inductance when the multi-mode drive circuit is controlled to drive wireless power transmission at the second transmit frequency.

10. The wireless power transmitter of claim 1, wherein the first transmit frequency is lower than 300 kHz and the second transmit frequency is higher than 1 MHz.

11. The wireless power transmitter of claim 10, wherein the second transmit frequency is between 6.765 MHz and 6.795 MHz.

12. The wireless power transmitter of claim 1, further comprising:
    the first transmit coil to transmit wireless power at the first transmit frequency; and
    the second transmit coil to transmit wireless power at the second transmit frequency.

13. The wireless power transmitter of claim 1, wherein a first terminal of the first matching network is connected to a first terminal of the second matching network, and wherein a second terminal of the first matching network is connected to a second terminal of the second matching network.

14. The wireless power transmitter of claim 1, wherein the multi-mode drive circuit is an inverter, the first matching network is connected to an output of the inverter and the second matching network is connected to the output of the inverter.

15. A wireless power transmission method for a wireless power transmitter comprising a multi-mode drive circuit having a controllable resonant frequency, the method comprising:
    (A) detecting, by the wireless power transmitter, a type of wireless power receiver that is present in the vicinity of the wireless power transmitter,
    (B) controlling the multi-mode drive circuit to have a first resonant frequency to drive wireless power transmission at a first transmit frequency in response to detecting that the wireless power receiver is of a type that receives power wirelessly at the first transmit frequency, wherein the wireless power transmission at the first transmit frequency is performed by providing a first signal from the multi-mode drive circuit to a first matching network that provides the first signal to a first transmit coil; and (C) controlling the multi-mode drive circuit to have a second resonant frequency to drive wireless power transmission at a second transmit frequency different from the first transmit frequency, wherein the wireless power transmission at the second transmit frequency is performed by providing a first signal from the multi-mode drive circuit to a second matching network that provides the second signal to a second transmit coil, and wherein the first matching network is connected to the second matching network.

16. The wireless power transmission method of claim 15, further comprising changing a variable capacitance of the multi-mode drive circuit to change the controllable resonant frequency.

17. The wireless power transmission method of claim 16, wherein the variable capacitance is changed by a switch that is controlled to connect or disconnect a capacitor to control whether the capacitor contributes to the variable capacitance.

18. The wireless power transmission method of claim 17, further comprising changing a variable inductance of the multi-mode drive circuit by connecting an additional inductor when the capacitor is connected.

19. The wireless power transmission method of claim 15, further comprising changing a variable inductance of the multi-mode drive circuit.

20. The wireless power transmission method of claim 19, wherein the variable inductance is changed by a switch that is controlled to connect or disconnect an inductor to control whether the inductor contributes to the variable inductance.

21. The wireless power transmission method of claim 20, further comprising changing a variable capacitance of the multi-mode drive circuit by connecting a capacitor when the inductor is connected.

22. The wireless power transmission method of claim 15, wherein (C) is performed in response to detection of a wireless power receiver that can receive power wirelessly at the second transmit frequency.

23. The wireless power transmission method of claim 15, wherein a first terminal of the first matching network is connected to a first terminal of the second matching network, and wherein a second terminal of the first matching network is connected to a second terminal of the second matching network.

24. The wireless power transmission method of claim 15, wherein the multi-mode drive circuit is an inverter, the first matching network is connected to an output of the inverter and the second matching network is connected to the output of the inverter.

* * * * *